S. SHAPIRO.
REFRIGERATING ATTACHMENT FOR MILK CANS.
APPLICATION FILED JAN. 8, 1910.

960,046.

Patented May 31, 1910.

Witnesses

Inventor
Samuel Shapiro,
By Joshua R. H. Potts,
Attorney

UNITED STATES PATENT OFFICE.

SAMUEL SHAPIRO, OF PHILADELPHIA, PENNSYLVANIA.

REFRIGERATING ATTACHMENT FOR MILK-CANS.

960,046.  Specification of Letters Patent.  Patented May 31, 1910.

Application filed January 8, 1910. Serial No. 537,042.

*To all whom it may concern:*

Be it known that I, SAMUEL SHAPIRO, a citizen of the United States, residing at Philadelphia, in the county of Philadelphia and State of Pennsylvania, have invented certain new and useful Improvements in a Refrigerating Attachment for Milk-Cans, of which the following is a specification.

My invention relates to improvements in refrigerating attachments for milk cans, the object of the invention being to provide a hollow, curved, or circular receptacle adapted to contain ice or other refrigerant, and adapted to be supported around the neck or spout of a milk can and rest upon the can, so that the interchange of temperatures between the refrigerating attachment and the milk of the can will keep the milk sweet in transit, and as the refrigerating attachment is located at the top where the cream forms and which is always the first to sour, this cream will be maintained cold and kept from souring.

A further object is to provide an improved attachment of this character which is preferably covered or coated with a paint or covering of non-conducting material, such for example as asbestos paint, and the like, on its outer surfaces; that is, on its upper and outer walls, the two inner walls of the attachment being free from such coating so as to permit a free interchange of temperatures at the inner wall of the attachment, but to prevent, as far as possible, an interchange of temperatures between the outside air and the attachment, thus utilizing to the maximum extent, the cooling properties of the refrigerant in the attachment.

A further object is to provide an improved attachment of this character which can be cheaply manufactured and sold, which can be readily placed upon any ordinary milk can, and which will not take up any additional space in the cars during shipment, and which may be placed in position and removed without difficulty.

With these and other objects in view, the invention consists in certain novel features of construction and combinations and arrangements of parts, as will be more fully hereinafter described and pointed out in the claims.

Figure 1:
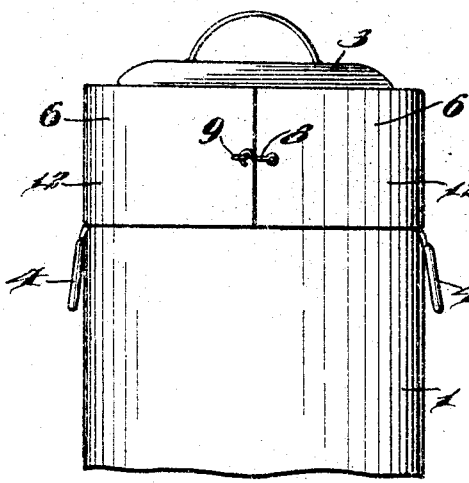
Figure 2:
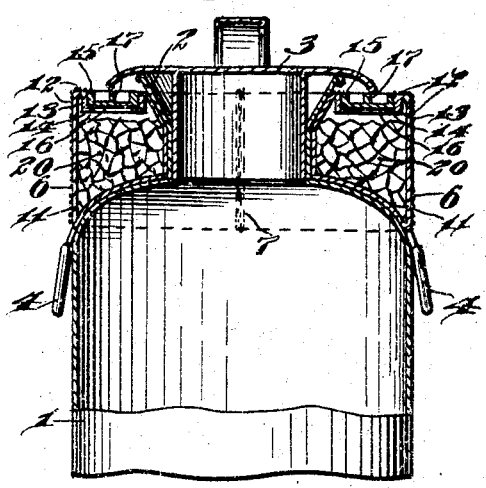
Figure 3:
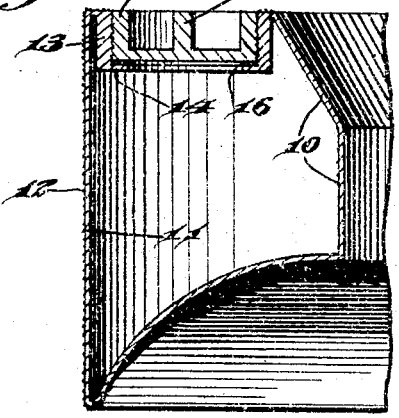
Figure 4:
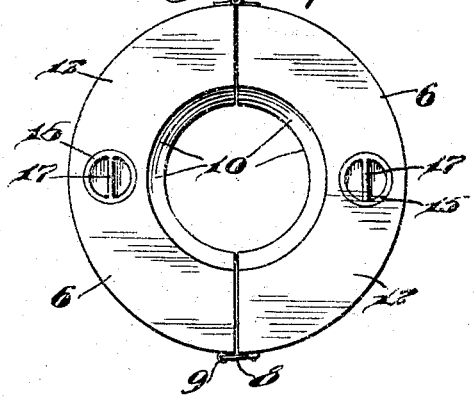
Figure 5:
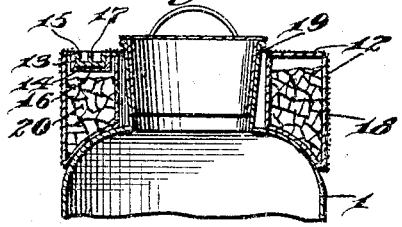
Figure 6:
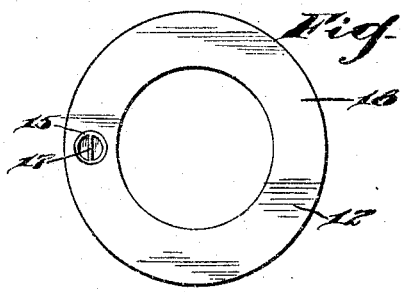

In the accompanying drawings: Figure 1 is a fragmentary view in side elevation illustrating my improvements in position on a milk can. Fig. 2 is a view in longitudinal section of Fig. 1. Fig. 3 is an enlarged fragmentary view in vertical section. Fig. 4 is a plan view of the attachment removed, and Figs. 5 and 6 are views in section and top plan, illustrating a modified form of my invention.

1 represents an ordinary milk can having the outwardly flaring neck 2.

3 is the ordinary cover of the can and 4 the handles at the sides of the can.

My improved attachment illustrated in Figs. 1, 2, 3, and 4, comprises two half-sections 6, 6, each half-section comprising a semi-circle and the sections connected at one end by a hinge 7, and at their other end by a hook 8 and an eye 9, or other suitable fastener.

It will be noted particularly by reference to Fig. 2, that the inner walls 10 of the sections 6, 6, incline at their upper portions to conform to the shape of the outwardly flaring neck 2, while the outer walls 11 of the sections 6, 6, are vertical and in line substantially with the vertical walls of the can, so that when the attachment is in position on the can it does not take up any additional room in the car, but allows just as many cans to be shipped in the car as could be done without the attachment. These sections 6, 6, are hollow as illustrated, and are preferably made of metal with a coating 12 of varnish or paint of the non-conducting type, on the outer faces of the vertical and top walls of the sections 6, 6, and the outside air. The top walls of these sections 6, 6, are made with screw threaded inwardly projecting rings 13, having inwardly projecting flanges 14 at their inner ends and plugs 15 adapted to screw into the rings 13 and against gaskets 16 interposed between the plugs 15 and the flanges 14, so as to form a perfectly air tight closure, it being understood that these rings 16 serve as entrances through which the ice, or other suitable refrigerant, is to be inserted to fill the chambers in the sections. The plug 15 is preferably recessed as shown, to form a finger hold 17 to facilitate its manipulation, and preferably when in place, lies flush with the upper face of the sections, so as to prevent its becoming injured by an object striking the same.

When the hook 8 is thrown back, out of the eye 9, the attachment can be readily removed from the can by swinging the sections 6, 6, on hinge 7, and the sections can be recharged with ice, or other refrigerant, and can be quickly placed in position around another can, and as above stated, the interchange of temperatures between the refrigerant and the milk will maintain the milk cold and keep it from souring in transit.

In Figs. 5 and 6 a modification is shown, in which the attachment 18 is in the form of a single ring not made in sections as is the preferred form, and this modified structure is only adapted for use where the old style of comparatively straight spout 19 is provided on the can, but where the flaring mouth such as at 2 is employed, a sectional attachment is advisable.

With both forms of my improvements, it will be noted that the external diameter of the attachment is the same as the external diameter of the can, so that the cans can be packed as close together as heretofore, and no more space utilized than heretofore, and by charging attachment with small pieces of ice as illustrated at 20 in the drawings, the milk in the can may be kept cool for a long time, long enough for any ordinary shipment. While I preferably use ice as a refrigerant, I do not limit myself to the same, but may employ any refrigerant which might be used for the purpose.

Various slight changes might be made in the general form and arrangement of the parts described without departing from my invention, and hence I do not restrict myself to the precise details set forth, but consider myself at liberty to make such changes and alterations as fairly fall within the spirit and scope of the appended claims.

Having thus described my invention what I claim as new and desire to secure by Letters Patent is:—

1. An attachment for milk cans, comprising a circular ring independent of the can and of the cover, constituting an annular refrigerant chamber, and constructed to be positioned around the neck of an ordinary milk can, substantially as described.

2. An attachment for milk cans, comprising a can neck confining ring consisting of two semi-circular sections, each section constituting a refrigerant chamber, said sections connected at one end by a hinge, a fastening device at the other ends of said sections, and removable plugs in the walls of said chamber, closing entrances to the chambers, substantially as described.

3. An attachment for milk cans, comprising a can neck confining ring consisting of two semi-circular sections, a hinge connecting said sections at one end, a hook and eye connecting said sections at the other end, each section comprising a hollow refrigerant receiving chamber, removable plugs normally closing entrances to said chambers, and the inner walls of said sections shaped to conform to the flaring spouts or neck portions of the ordinary milk cans, substantially as described.

4. In combination with a milk can, having a restricted neck and a cover on the upper end of said neck, of a refrigerating ring positioned around the neck below the cover, and bearing upon the upper end of the can, said ring comprising two half sections hinged together at one end and removably connected at their other ends, each section constituting a refrigerant chamber, substantially as described.

In testimony whereof I have signed my name to this specification in the presence of two subscribing witnesses.

SAMUEL SHAPIRO.

Witnesses:
BEATRICE HERMAN,
R. H. KRENKEL.